(12) United States Patent
Danneffel et al.

(10) Patent No.: US 10,274,123 B2
(45) Date of Patent: Apr. 30, 2019

(54) PIPE THREAD PROTECTOR WITH AN INNER TAPERED GROOVE

(71) Applicant: Universal Moulding Co. Ltd., Port Coquitlam (CA)

(72) Inventors: Max Danneffel, Port Coquitlam (CA); John Danneffel, Port Coquitlam (CA)

(73) Assignee: Universal Moulding Co. Ltd., Port Coquitlam (CA)

( * ) Notice: Subject to any disclaimer, the term of this patent is extended or adjusted under 35 U.S.C. 154(b) by 0 days.

(21) Appl. No.: 15/823,563

(22) Filed: Nov. 27, 2017

(65) Prior Publication Data

US 2018/0080595 A1 Mar. 22, 2018

Related U.S. Application Data

(63) Continuation-in-part of application No. 14/824,012, filed on Aug. 11, 2015, now Pat. No. 9,828,150.

(60) Provisional application No. 62/036,092, filed on Aug. 11, 2014.

(51) Int. Cl.
*F16L 57/00* (2006.01)
*F16L 57/06* (2006.01)
*B65D 59/06* (2006.01)

(52) U.S. Cl.
CPC ............ *F16L 57/06* (2013.01); *B65D 59/06* (2013.01); *F16L 57/005* (2013.01)

(58) Field of Classification Search
CPC .................................................. F16L 57/005
USPC ............................................ 138/96 R, 96 T
See application file for complete search history.

(56) References Cited

U.S. PATENT DOCUMENTS

| | | | | |
|---|---|---|---|---|
| 2,727,651 A | * | 12/1955 | Mickelson | B65D 41/0414 |
| | | | | 138/96 T |
| 2,737,205 A | * | 3/1956 | Stringfield | B65D 59/02 |
| | | | | 138/89 |
| 3,074,579 A | * | 1/1963 | Miller | B65D 41/0421 |
| | | | | 138/96 T |
| 4,139,023 A | | 2/1979 | Turley | |
| 4,269,232 A | * | 5/1981 | Witschi | B65D 59/06 |
| | | | | 138/89 |
| 4,380,304 A | | 4/1983 | Anderson | |
| 4,553,567 A | | 11/1985 | Telander | |
| 6,085,478 A | | 7/2000 | Workman | |
| 6,196,270 B1 | | 3/2001 | Richards | |
| 7,284,770 B2 | * | 10/2007 | Dell'erba | B65D 59/06 |
| | | | | 138/96 T |
| 7,404,419 B2 | | 7/2008 | Pajaro Gonzalez et al. | |
| 7,469,721 B2 | * | 12/2008 | Takano | E21B 17/042 |
| | | | | 138/96 T |
| 9,828,150 B2 | * | 11/2017 | Danneffel | B65D 59/06 |
| 2006/0042709 A1 | * | 3/2006 | Takano | E21B 17/042 |
| | | | | 138/96 T |
| 2006/0266428 A1 | * | 11/2006 | Pajaro Gonzalez | ... B65D 59/06 |
| | | | | 138/96 T |
| 2008/0092977 A1 | * | 4/2008 | Zeyfang | F16L 55/115 |
| | | | | 138/96 R |
| 2008/0190509 A1 | | 8/2008 | Cox | |

(Continued)

*Primary Examiner* — James Hook
(74) *Attorney, Agent, or Firm* — Cameron IP

(57) ABSTRACT

A thread protector comprises a hollow cylindrical body with a substantially closed end and a threaded inner annular wall extending from the substantially closed end. An annular ring extends inwardly from the substantially closed end. The annular ring has a sloped wall which is spaced-apart from and faces the threaded inner annular wall.

10 Claims, 14 Drawing Sheets

(56) References Cited

U.S. PATENT DOCUMENTS

| | | | |
|---|---|---|---|
| 2013/0105028 A1* | 5/2013 | Lockard | F16L 57/005 |
| | | | 138/96 T |
| 2013/0213516 A1* | 8/2013 | Clem | F16L 57/005 |
| | | | 138/96 T |
| 2014/0261849 A1* | 9/2014 | Danneffel | B65D 59/06 |
| | | | 138/96 T |

* cited by examiner

PIPE THREAD PROTECTOR WITH AN INNER TAPERED GROOVE

FIELD OF THE INVENTION

The present invention relates to a thread protector and, in particular, to a thread protector with an inner tapered groove to restrain the thread protector against rotation relative to a threaded pipe end.

BACKGROUND OF THE INVENTION

It is known to use thread protectors to protect threaded pipe ends from damage during storage and transport. For example, U.S. Pat. No. 4,139,023 discloses a pipe thread protector which is made of a resilient material and has a cup-shaped body which overlies the pipe threads to be protected. The outermost portion of the cup-shaped body is provided with protector threads which are complementary in shape to the pipe threads. Inwardly of the protector threads, the cup-shaped body is provided with a plurality of tapered wedging ribs. These wedging ribs automatically center the cup-shaped body on the threaded pipe end as the pipe thread protector is urged over the pipe end for subsequent engagement of the protector threads with the pipe threads. The wedging ribs thereafter frictionally restrain the protector against rotation relative to the pipe end.

U.S. Pat. No. 4,553,567 discloses a protector for a threaded end section of a cylindrical part, such as a pipe, which has a tubular body having a plurality of flexible ribs projecting from a wall of the body. The ribs, in an unflexed condition, extend at an acute angle in a forward direction toward the pipe upon which the protector is placed on the threaded end section of the pipe. The body is disposed in space telescoped confronting relation to the threaded end section of the pipe to preclude circumferential and radial destructive stress between the body and the threaded end of the pipe. In one embodiment, the ribs comprise first ribs engageable with the threaded end section of the pipe and second ribs located adjacent the first ribs in holding engagement with the threaded end section of the pipe.

It is of utmost importance that thread protectors do not loosen or fall off during use and expose pipe threads. A pipe is subject to vibration loading when it is transported by a flat-bed truck or rail. Vibrations can cause prior art protectors to loosen or fall off and expose the pipe threads to severe damage. The problem is made worse under extreme weather conditions when hot temperatures cause female thread protectors to expand and cold temperatures cause male thread protectors to shrink. Changes in diameter caused by temperature fluctuations can make high-density polyethylene thread protectors extremely susceptible to disengaging from the pipe threads and vibrating loose.

SUMMARY OF THE INVENTION

There is provided a thread protector provided with an inner tapered groove to resist rotational motion of the thread protector relative to a threaded pipe end.

The thread protector comprises a hollow cylindrical body with a substantially closed end and a threaded inner annular wall extending from the substantially closed end. There is an annular ring extending inwardly from the substantially closed end of the hollow cylindrical body. The annular ring has a sloped wall which is spaced-apart from and faces the threaded inner annular wall. The sloped wall of the annular ring may be deformable while the annular ring may be rigid to withstand torque and resist deflection. The sloped wall of the annular ring and the threaded inner annular wall of the hollow cylindrical body may define a tapered groove. The sloped wall of the annular ring may be oblique relative to a longitudinal axis of the thread protector. The sloped wall of the annular ring may include a plurality of ridges.

The thread protector may include spaced-apart bumpers extending circumferentially about the substantially closed end of the hollow cylindrical body. The bumpers may be crescent-shaped and each bumper may have a crescent-shaped recess. There may be a plurality of spaced-apart ribs extending circumferentially about the substantially closed end and between the bumpers.

There may be a recessed portion in the substantially closed end of the hollow cylindrical body. The recessed portion may include an annular wall and a disk-shaped bottom. The annular wall of the recessed portion may be concentric with the threaded inner annular wall. There may be a plurality of spaced-apart ribs extending about and between the annular ring and the annular wall of the recessed portion. The thread protector may have an opening which extends through the substantially closed end of the hollow cylindrical body.

A combination of a pipe and a thread protector comprises a pipe with an inner wall and a male threaded pipe end, and a thread protector with a hollow cylindrical body having a substantially closed end and a threaded inner annular wall extending from the substantially closed end. There is an annular ring extending inwardly from the substantially closed end of the hollow cylindrical body. The annular ring has a sloped wall which is spaced-apart from and faces the threaded inner annular wall. The sloped wall of the annular ring frictionally engages the inner wall of the pipe when the threaded pipe end of the pipe and the thread protector are threadedly engaged, thereby resisting rotational motion of the thread protector relative to the threaded pipe end of the pipe. The sloped wall of the annular ring may be deformable, to allow the male threaded pipe end to embed into the sloped wall of the annular ring, while the annular ring may be rigid to withstand torque and resist deflection.

BRIEF DESCRIPTION OF THE DRAWINGS

The invention will be more readily understood from the following description of the embodiments thereof given, by way of example only, with reference to the accompanying drawings, in which.

DESCRIPTION OF SPECIFIC EMBODIMENTS

Figure 1:
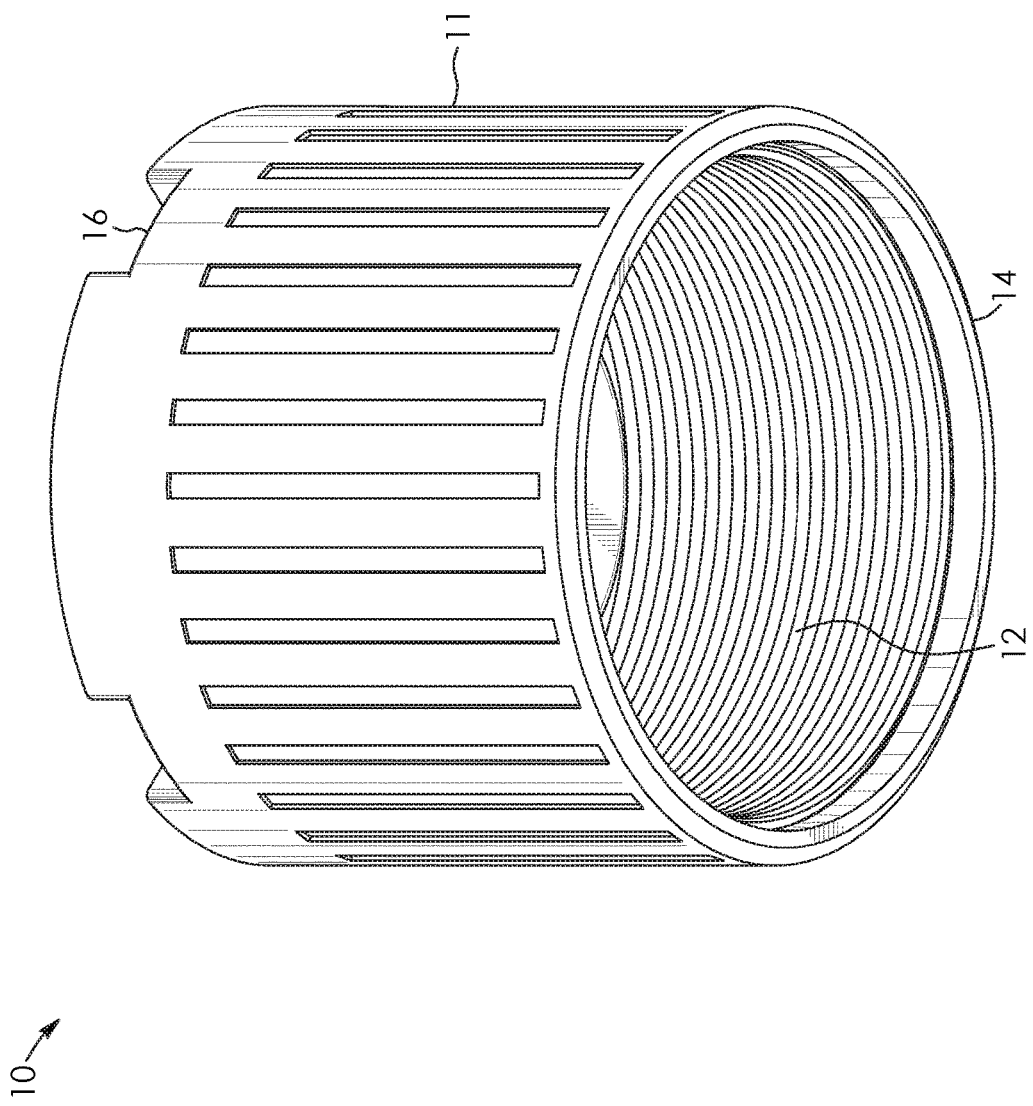
FIG. 1 is a perspective view of a first embodiment of an improved female thread protector.
Figure 2:
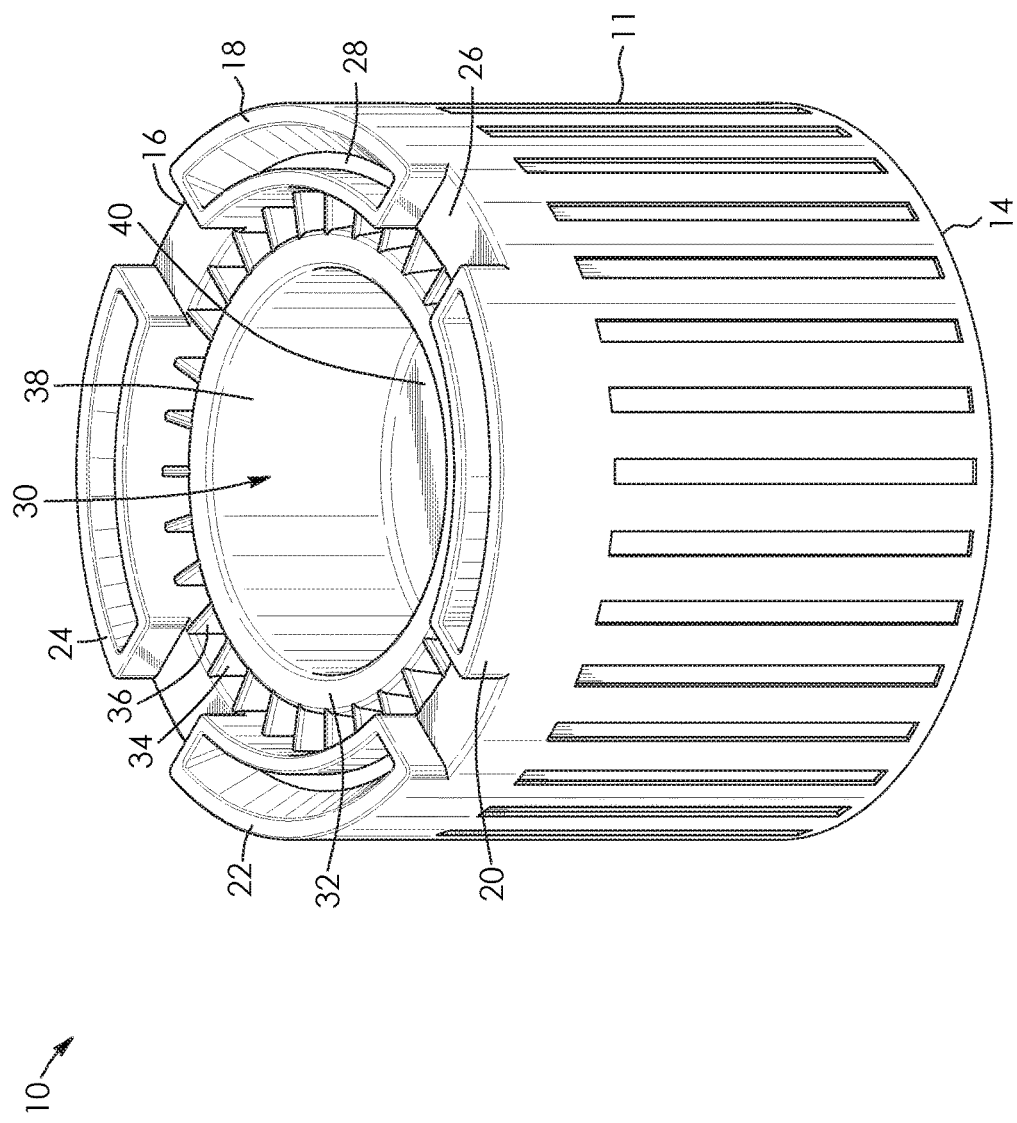
FIG. 2 is another perspective view of the female thread protector of FIG. 1.

Referring to the drawings and first to FIGS. 1 and 2, there is shown a first embodiment of an improved female thread protector 10. The female thread protector 10 has a hollow cylindrical body 11 with an open end 14, which is best shown in FIG. 1, and a substantially closed end 16 which is best shown in FIG. 2. There is a threaded annular wall 12 extending between the open end 14 and the substantially closed end 16. The threaded annular wall 12 is an inner annular wall of the hollow cylindrical body 11. Spaced-apart bumpers 18, 20, 22 and 24 extend circumferentially about an outer annular portion 26 of the substantially closed end 16. The bumpers assist in impact protection. The bumpers are crescent-shaped in this example and each bumper is provided with a central recess, for example, a crescent-shaped recess 28 as shown for one of the bumpers 18 in FIG. 2. The recesses in the bumpers may receive an installation tool or removal tool and also serve to reduce the material required to make the female thread protector.

Figure 5:
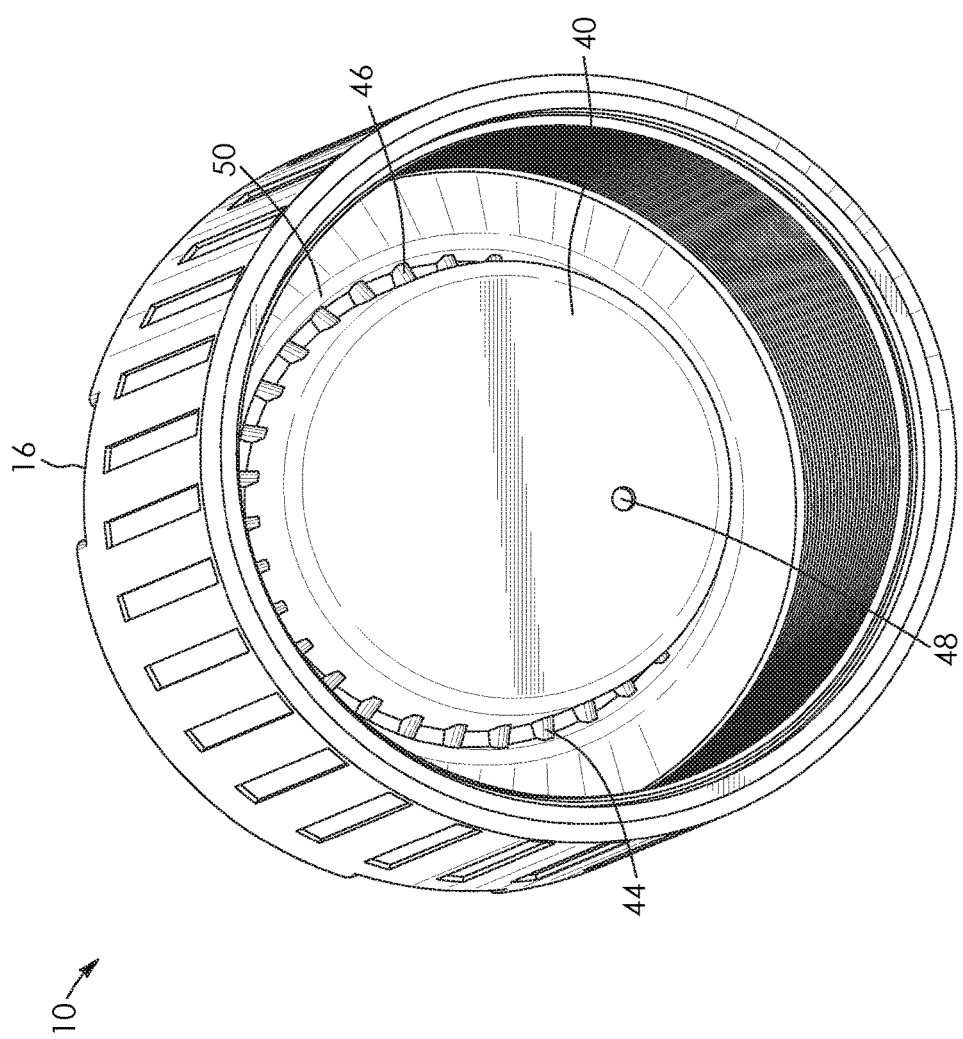
FIG. 5 is a perspective end view of the female thread protector of FIG. 1.

There is a central recessed portion 30 in the substantially closed end 16 of the female thread protector 10. The recessed portion 30 is surrounded by a rim 32. A plurality of spaced-apart impact energy absorbing ribs, for example, ribs 34 and 36, extend radially about and between the outer annular portion 26 and the rim 32. The ribs provide an energy absorption zone which helps protect the pipe if the female thread protector is subject to an impact. The recessed portion 30 includes an annular wall 38 and a disk-shaped bottom 40 in this example. The annular wall 38 is concentric with the threaded annular wall 12. The annular wall 38 and the disk-shaped bottom 40 thus form an interior portion 42 of the female thread protector 10 as can best be seen in FIG. 3. There is also a plurality of spaced-apart impact energy absorbing ribs, for example, ribs 44 and 46, extending about and between the threaded annular wall 12 and the annular wall 38. The ribs extend radially as best seen in FIG. 5. There is a small opening 48, shown in FIGS. 3 and 5, which extends through the disk-shaped bottom 40 of the recessed portion 30. The opening allows airflow through the pipe to minimize condensation.

Figure 3:
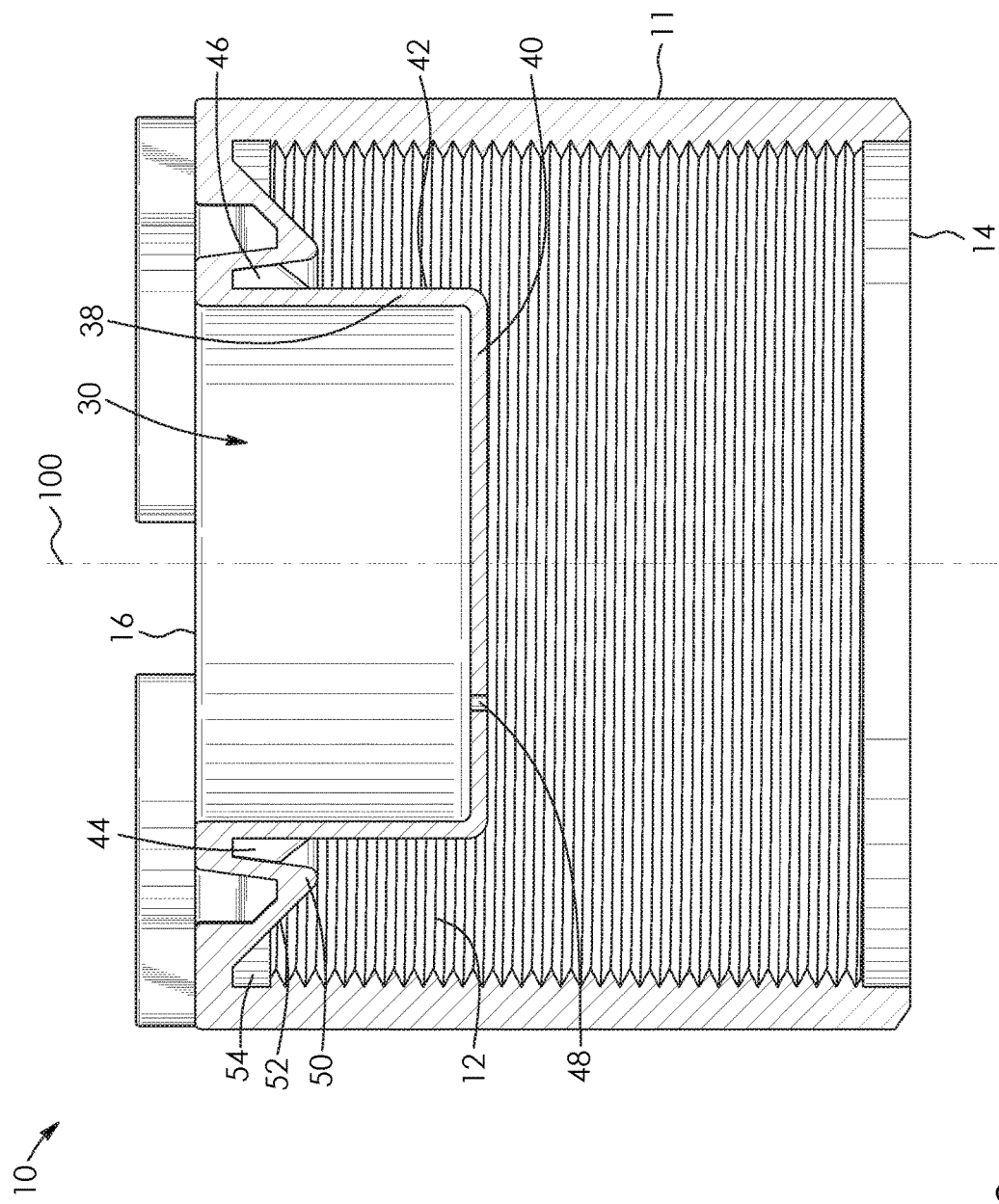
FIG. 3 is a sectional view of the female thread protector of FIG. 1.

The female thread protector 10 is further provided with an annular ring 50 extending inwardly from the substantially closed end 16 thereof as best shown in FIG. 5. The annular ring 50 has a sloped wall 52 which is spaced-apart from and faces the threaded annular wall 12 as shown in FIG. 3. The sloped wall 52 is oblique relative to a longitudinal axis 100 of the female thread protector 10. The sloped wall 52 and the threaded annular wall 12 define a tapered annular groove 54.

Figure 4:
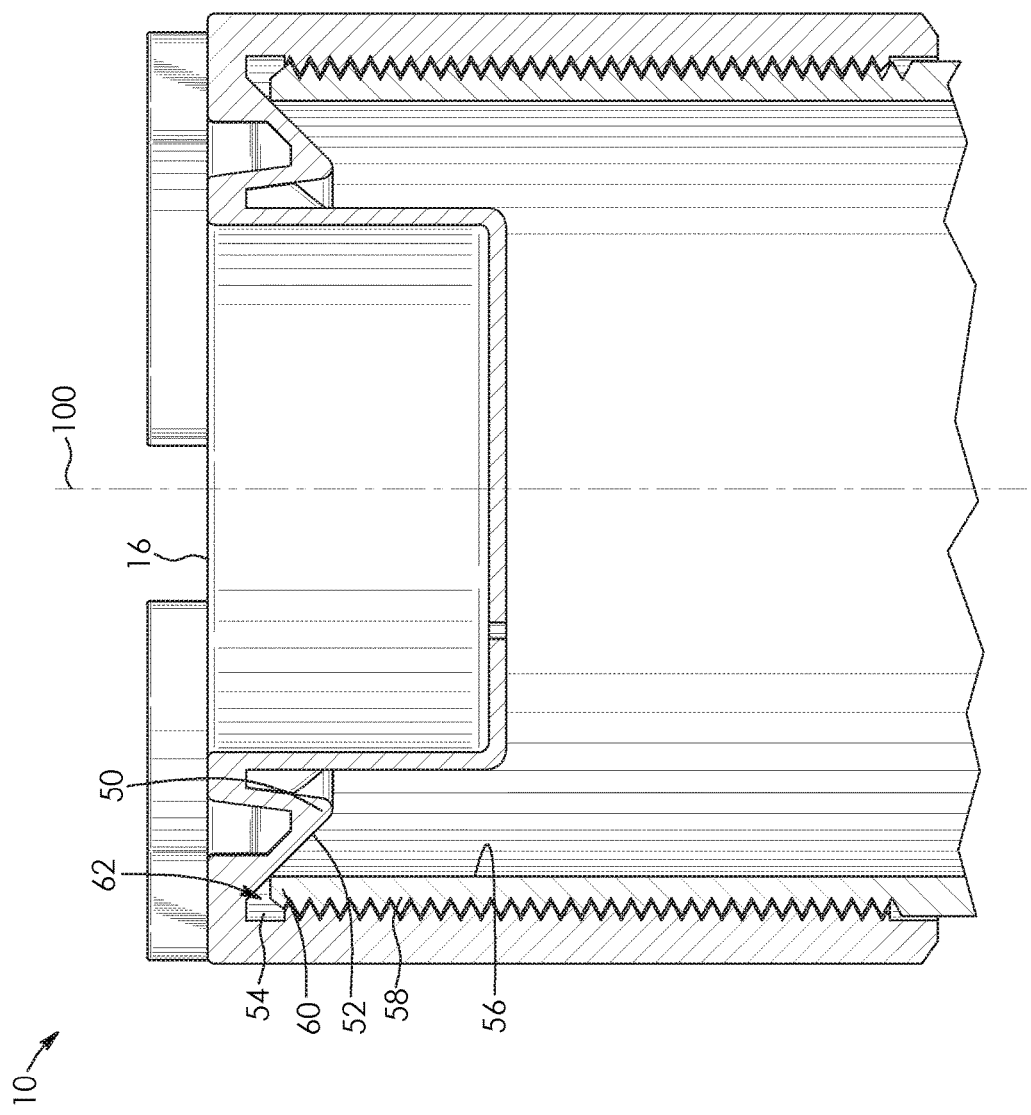
FIG. 4 is another sectional view of the female thread protector of FIG. 1 showing the female thread protector engaged with a male threaded pipe end.
Figure 6:
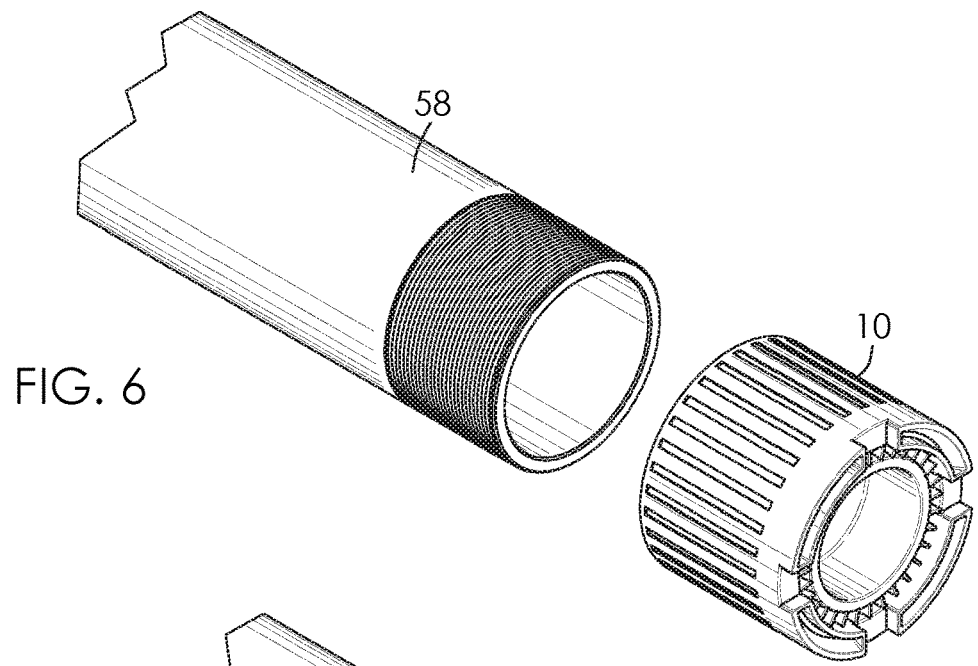
FIG. 6 is a perspective, exploded view of the female thread protector of FIG. 1 and a male threaded pipe end.
Figure 7:
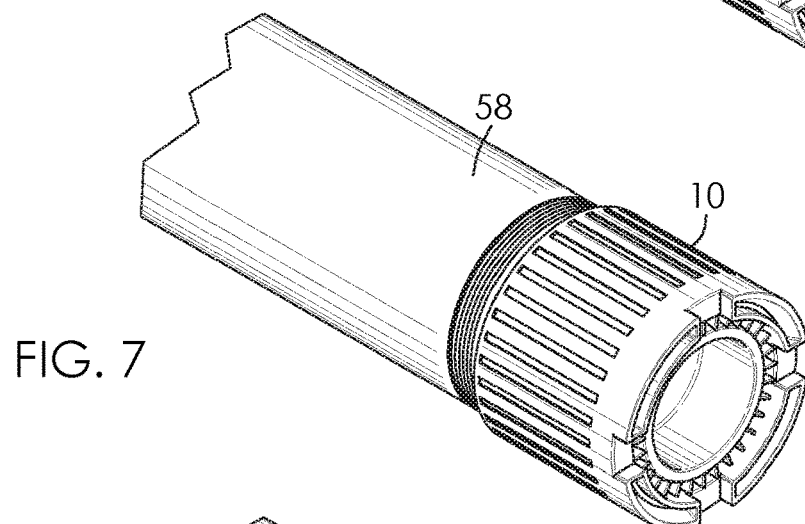
FIG. 7 is a perspective view showing the female thread protector of FIG. 1 partially threaded about the male threaded pipe end.
Figure 8:
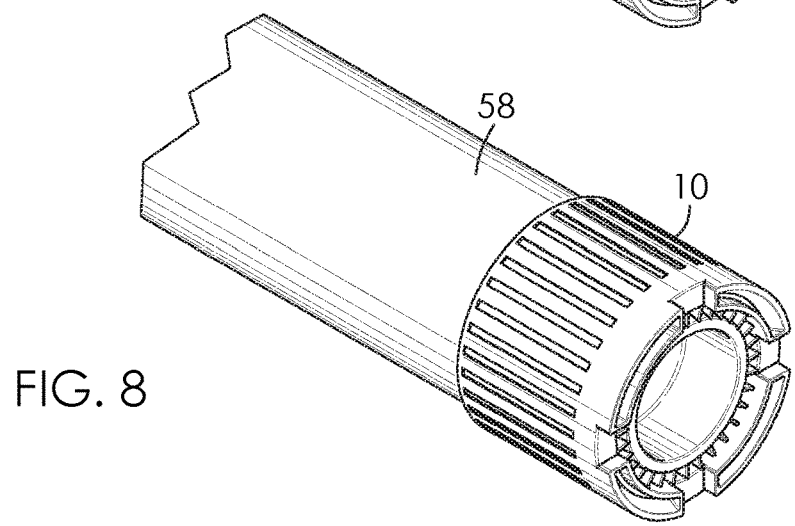
FIG. 8 is a perspective view showing the female thread protector of FIG. 1 fully threaded about the male threaded pipe end.

As shown in FIG. 4, the sloped wall 52 of the annular ring 50 comes into frictional engagement with an inner wall 56 of a male threaded pipe end 58 when the female thread protector 10 is threaded onto the male threaded pipe end. In particular, an end 60 of the male threaded pipe end 58 is wedged into the tapered annular groove 54 as the female thread protector 10 is tightened in place. This necessitates an additional rotational force to allow the female thread protector 10 to be threaded into the male threaded pipe end 58. Conversely, an additional rotational force is also required to unthread the female thread protector 10 from the male threaded pipe end 58. The additional rotational force required to unthread the female thread protector 10 from the male threaded pipe end 58 inhibits inadvertent loosening or removal of the thread protector with respect to the pipe. FIGS. 6 to 8 show the female thread protector 10 being threaded onto the male threaded pipe end 58.

The tapered shape of the annular groove 54 allows male threaded pipe ends with different wall thicknesses to be wedged into the groove. Male threaded pipe ends with thinner walls are wedged more deeply into the tapered annular groove 54 while male threaded pipe ends with thicker walls are wedged less deeply into the tapered annular groove 54. However, regardless of the wall thickness of the male threaded pipe end 58, there is a space 62, shown in FIG. 4, remaining between the tapered annular groove 54 and the end 60 of the male threaded pipe end when the female thread protector 10 is fully threaded about the male threaded pipe end. The space 62 provides a cushion for the end 60 of the male threaded pipe end 58. This protects the pipe when the female thread protector 10 is impacted on the substantially closed end 16 thereof. When the female thread protector 10 is impacted at an angle on the substantially closed end 16 thereof or impacted on the hollow cylindrical body 11 thereof, the annular ring 50 in combination with the impact energy absorbing ribs 34, 36, 44 and 46 provide additional structural support to the male threaded pipe end 58 by inhibiting inward bending of the male threaded pipe end as a result of the impact to the female thread protector.

In hot temperatures, the threaded annular wall 12 of the female thread protector 10 expands outwardly and away from the male threaded pipe end 58. However, the annular ring 50 also expands outwardly so that the sloped wall 52 thereof remains in frictional engagement with the inner wall 56 of the male threaded pipe end 58. This ensures that the end 60 of the male threaded pipe end 58 remains wedged into the tapered annular groove 54 during thermal expansion of the female thread protector 10. The tapered annular groove 54 creates a jamming effect when the female thread protector 10 is tightened onto the male threaded pipe end 58. This jamming effect results in a higher break-out force which is the initial force required for the female thread protector 10 to begin unthreading from the male threaded pipe end 58. The tapered annular groove 54 therefore increases the break-out force required to unthread the female thread protector 10 from the male threaded pipe end 58 in hot temperatures. The tapered annular groove 54 also reduces the tendency of the female thread protector 10 to spread apart from the male threaded pipe end 58 at the substantially closed end 16 thereof. The frictional engagement between the sloped wall 52 of the annular ring 50 and the inner wall 56 of the male threaded pipe end 58 also ensures that the threads of the threaded annular wall 12 of the female thread protector 10 remain sufficiently engaged with the threads of the male threaded pipe end 58 in hot temperatures. This results in a higher stripping force which is the force required to strip the female thread protector 10 from the threads of the male threaded pipe end 58.

Figure 9:
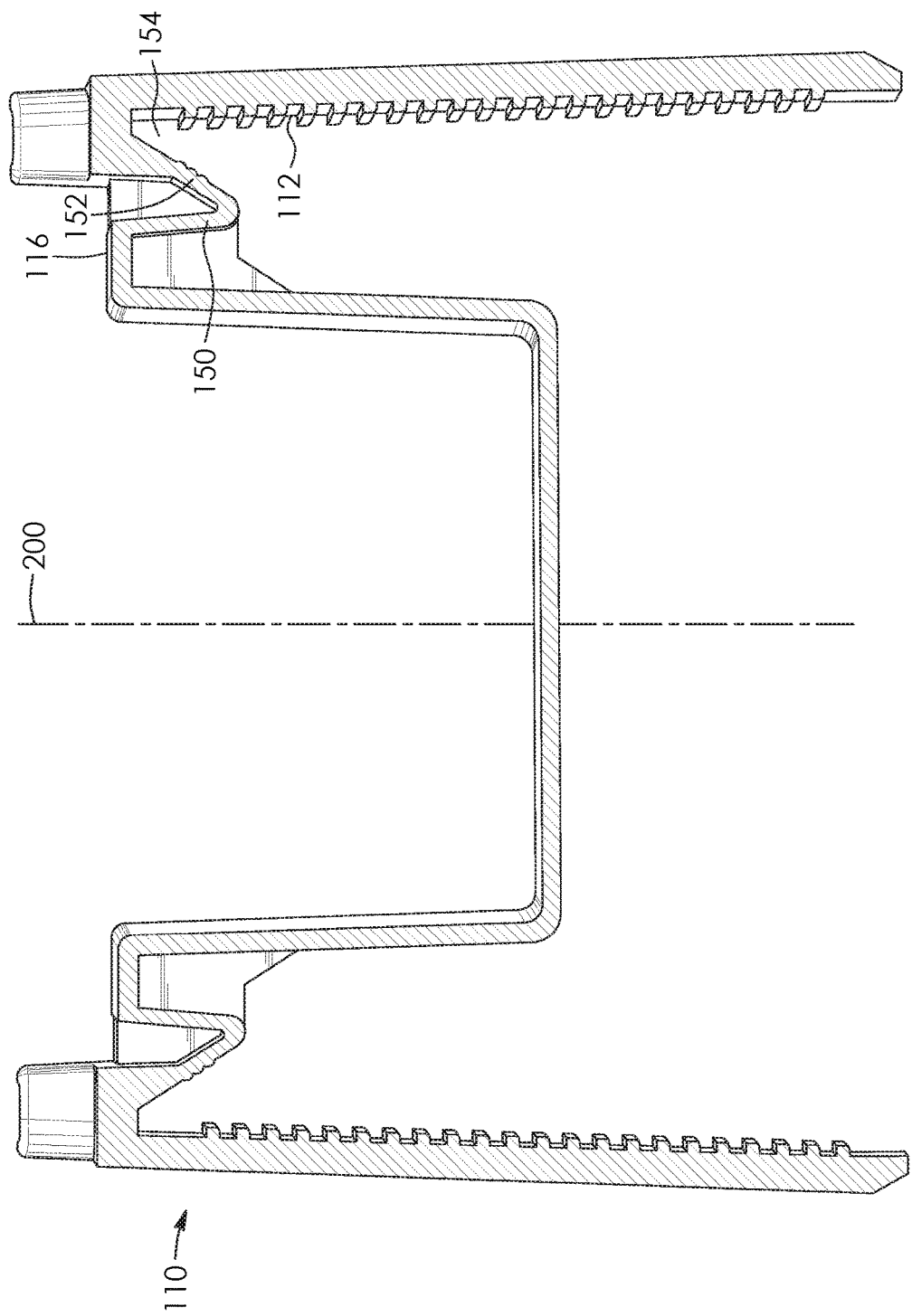
FIG. 9 is a sectional view of a second embodiment of an improved female thread protector.
Figure 10:
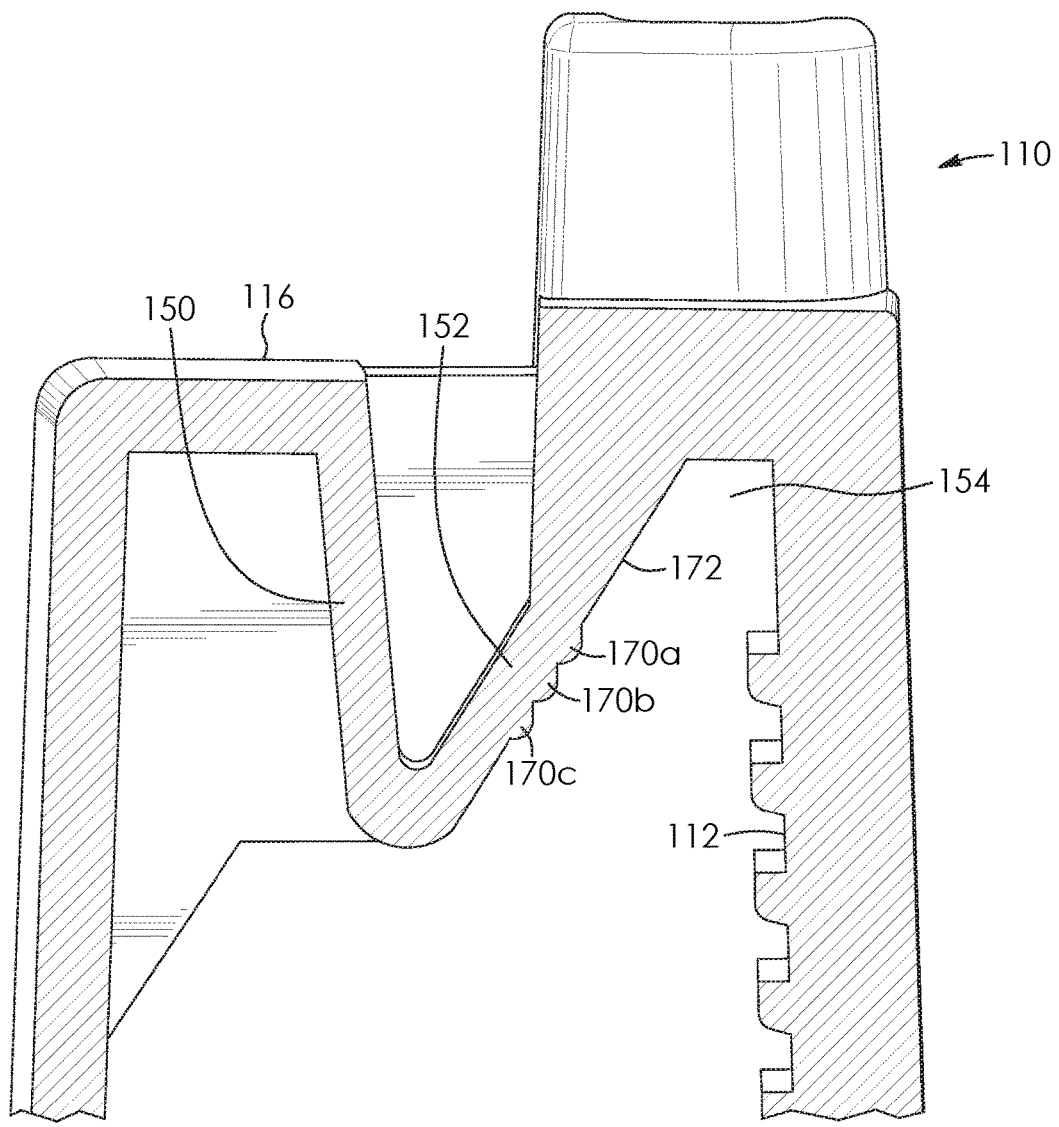
FIG. 10 is an enlarged, fragmentary view of the female thread protector of FIG. 9.
Figure 11:
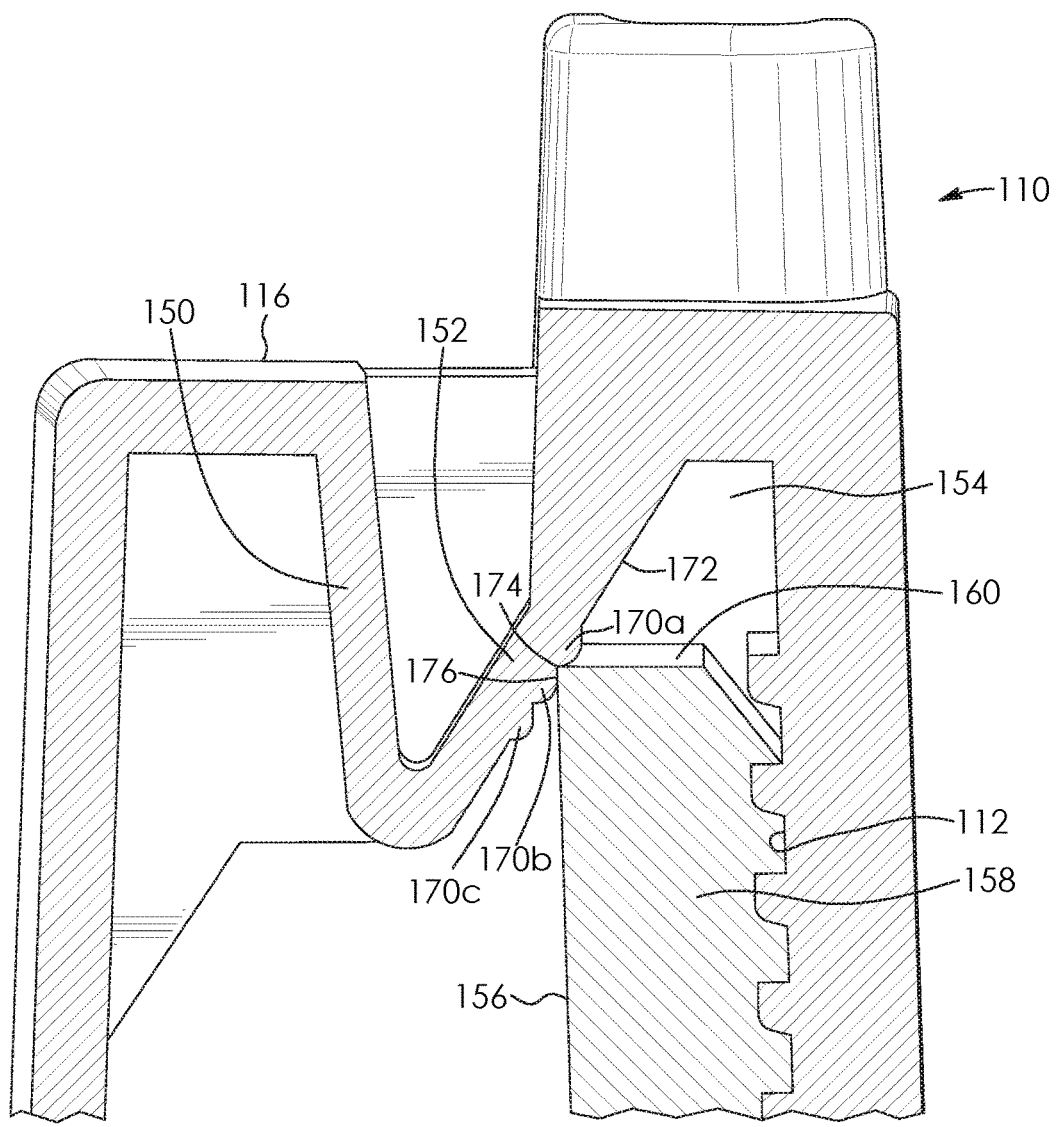
FIG. 11 is another enlarged, fragmentary view of the female thread protector of FIG. 9 showing the female thread protector engaged with a male threaded pipe end.

Referring now to FIGS. 9 to 11, there is shown a second embodiment of an improved female thread protector 110. The female thread protector 110 is generally similar to the female thread protector 10 shown in FIGS. 1 to 8. The female thread protector 110 has an annular ring 150 extending inwardly from a substantially closed end 116 thereof. The annular ring 150 has a sloped wall 152 which is spaced-apart from and faces a threaded annular wall 112 of the female thread protector 110. The sloped wall 152 is oblique relative to a longitudinal axis 200 of the female thread protector 110. The sloped wall 152 and the threaded annular wall 112 define a tapered annular groove 154. However, as best shown in FIG. 10, the sloped wall 152 of the annular ring 150 is provided with a plurality of ridges, for example, ridges 170a, 170b and 170c, on a surface 172 thereof facing the threaded annular wall 112. Referring now to FIG. 11, when the female thread protector 110 is threaded onto a male threaded pipe end 158, the sloped wall 152 of the annular ring 150 comes into frictional engagement with an inner wall 156 of the male threaded pipe end. In particular, an end 160 of the male threaded pipe end 158 is wedged into the tapered annular groove 154 and abuts, in this example, the ridge 170a on the sloped wall 152 of the annular ring 150. The end 160 of the male threaded pipe end 158 abuts a flat surface 174 of the ridge 170a while the inner wall 156 of the male threaded pipe end 158 abuts a flat surface 176 of the ridge 170b in this example. The flat surfaces 174 and 176 allow for better engagement between the inner wall 156 of the male threaded pipe end 158 and the sloped wall 152 of the annular ring 150. The ridges 170a, 170b and 170c are disposed along the sloped wall 152 so as to allow the female thread protector 110 to engage threaded pipe ends of varying wall thicknesses. For example, a male threaded pipe end with a thicker wall which is wedged less deeply into the tapered annular groove 154 may abut the ridge 170b or 170c at its end thereof instead.

Figure 12:
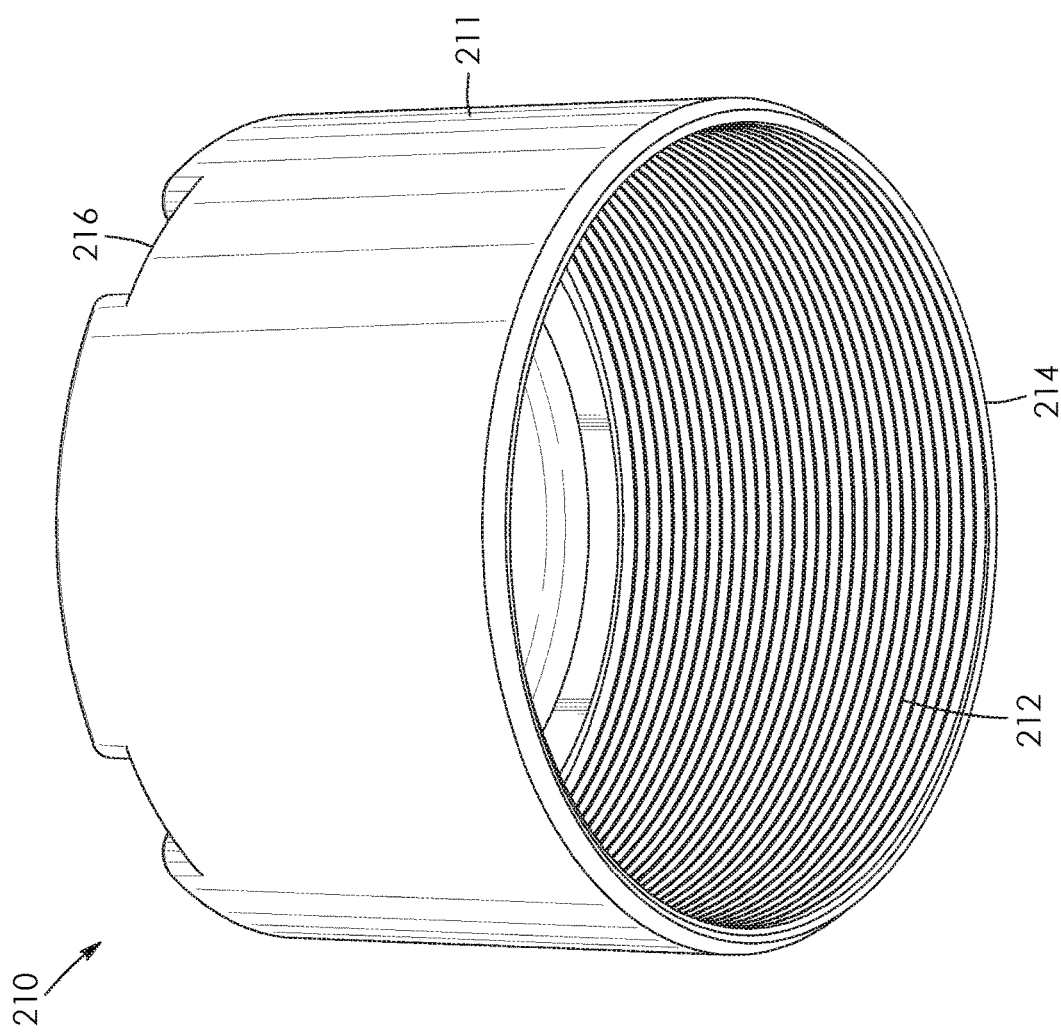
FIG. 12 is a perspective view of a third embodiment of an improved female thread protector.
Figure 13:
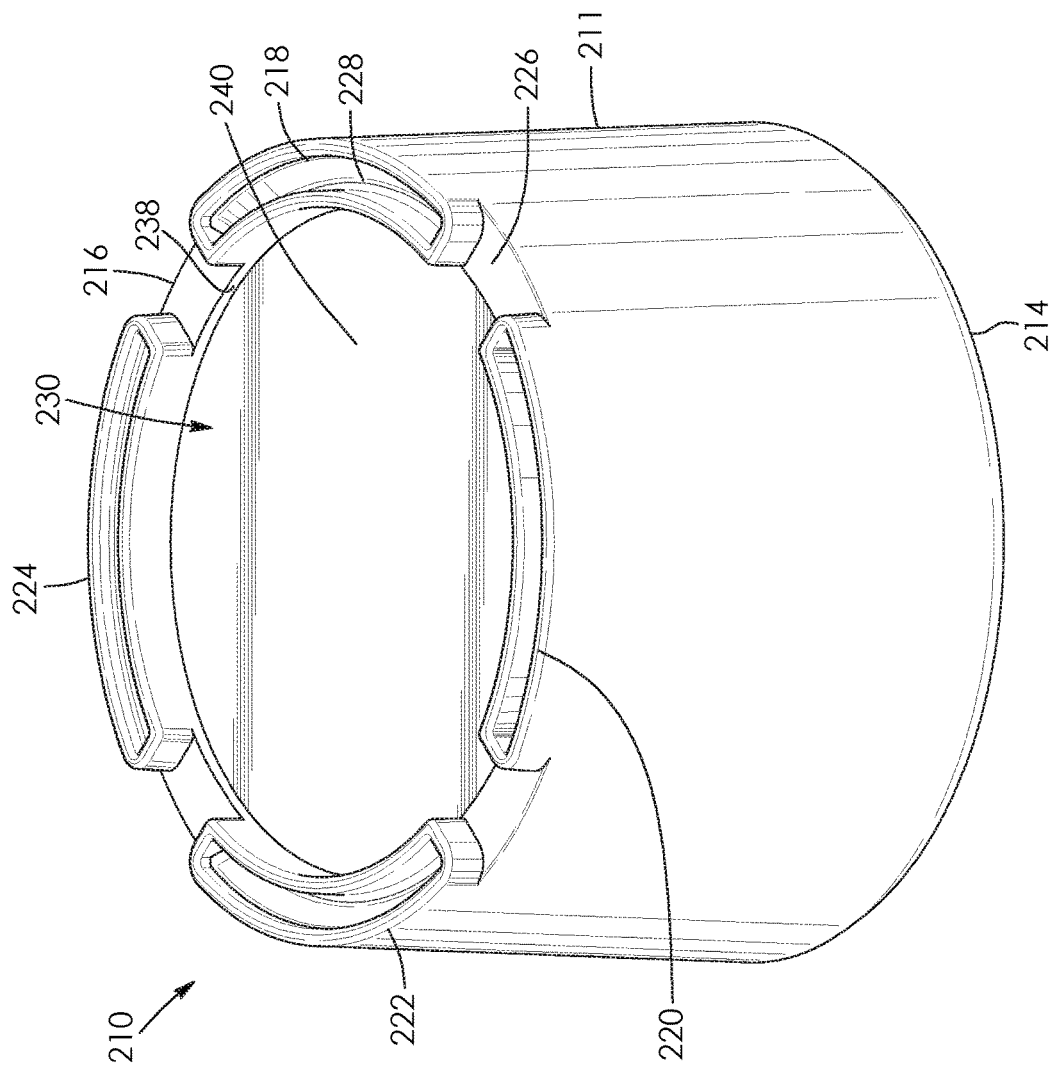
FIG. 13 is another perspective view of the female thread protector of FIG. 12.

Referring now to FIGS. 12 and 13, there is shown a third embodiment of an improved female thread protector 210. The female thread protector 210 has a hollow cylindrical body 211 with an open end 214, which is best shown in FIG. 12, and a closed end 216 which is best shown in FIG. 13. There is a threaded annular wall 212 extending between the open end 214 and the closed end 216. The threaded annular wall 212 is an inner annular wall of the hollow cylindrical body 211. Spaced-apart bumpers 218, 220, 222 and 224 extend circumferentially about an annular portion 226 of the closed end 216. The bumpers assist in impact protection. The bumpers are crescent-shaped in this example and each bumper is provided with a central recess, for example, a crescent-shaped recess 228 as shown for one of the bumpers in FIG. 13. The recesses in the bumpers may receive an installation tool or removal tool and also serve to reduce the material required to make the female thread protector. There is also a central recessed portion 230 in the closed end 216 of the female thread protector 210. The central recessed portion 230 includes an annular wall 238 and a disk-shaped bottom 240 in this example. The disk-shaped bottom 240 may be knocked out when the female thread protector 210 is installed.

Figure 14:
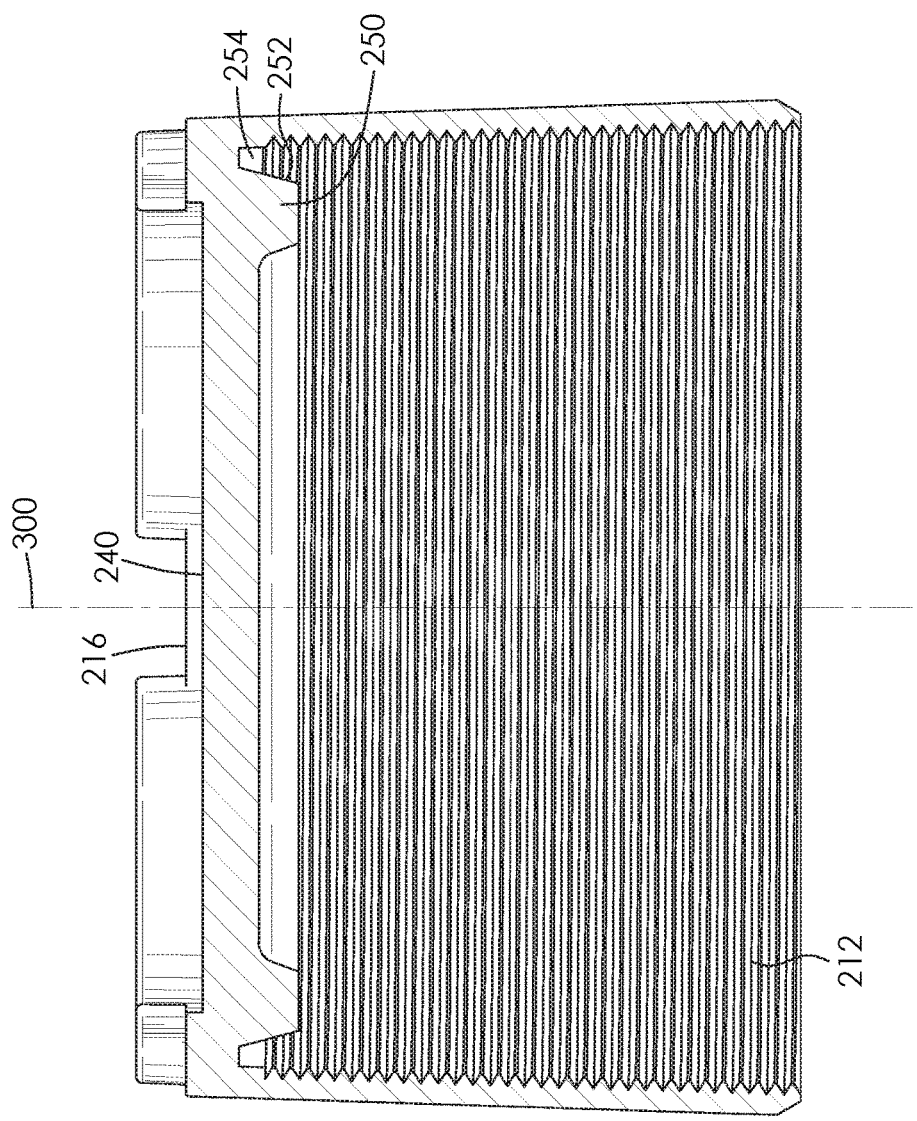
FIG. 14 is a sectional view of the female thread protector of FIG. 12.
Figure 15:
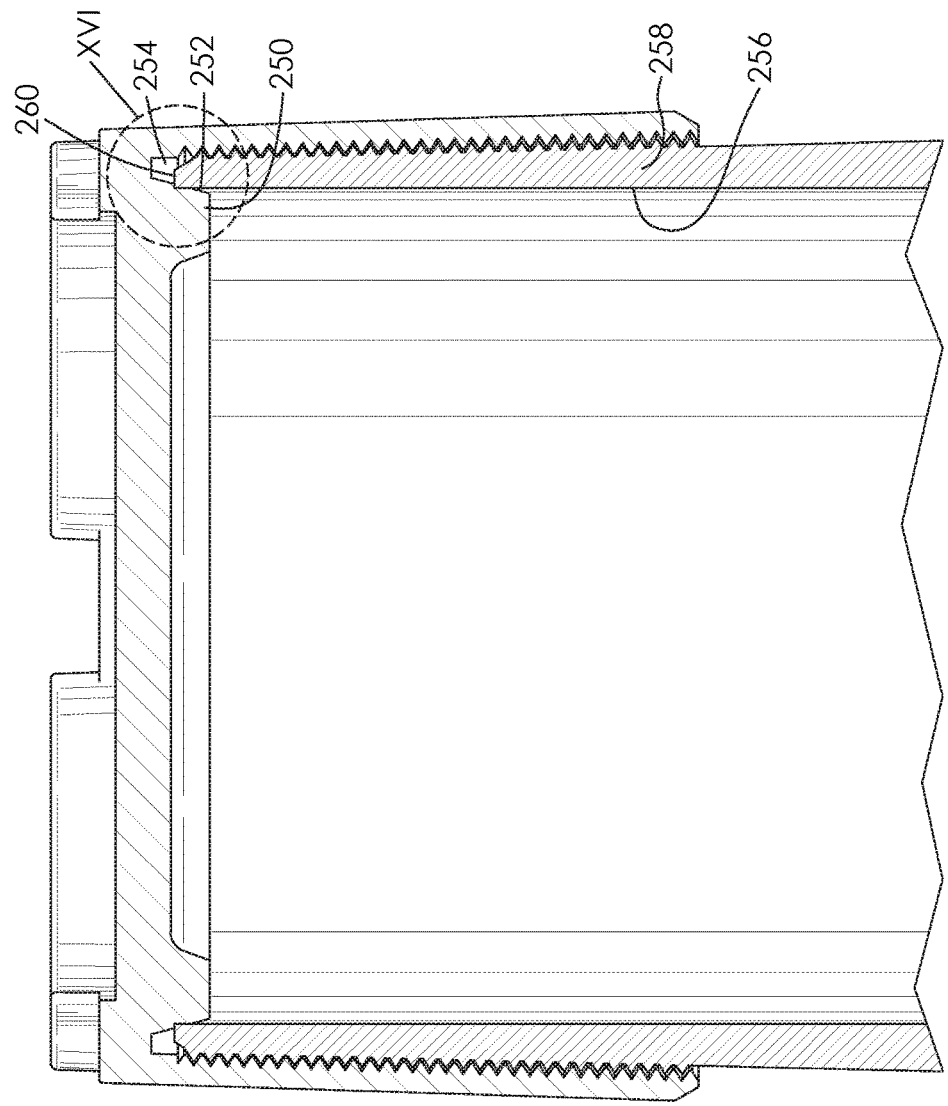
FIG. 15 is another sectional view of the female thread protector of FIG. 12 showing the female thread protector engaged with a male threaded pipe end.
Figure 16:
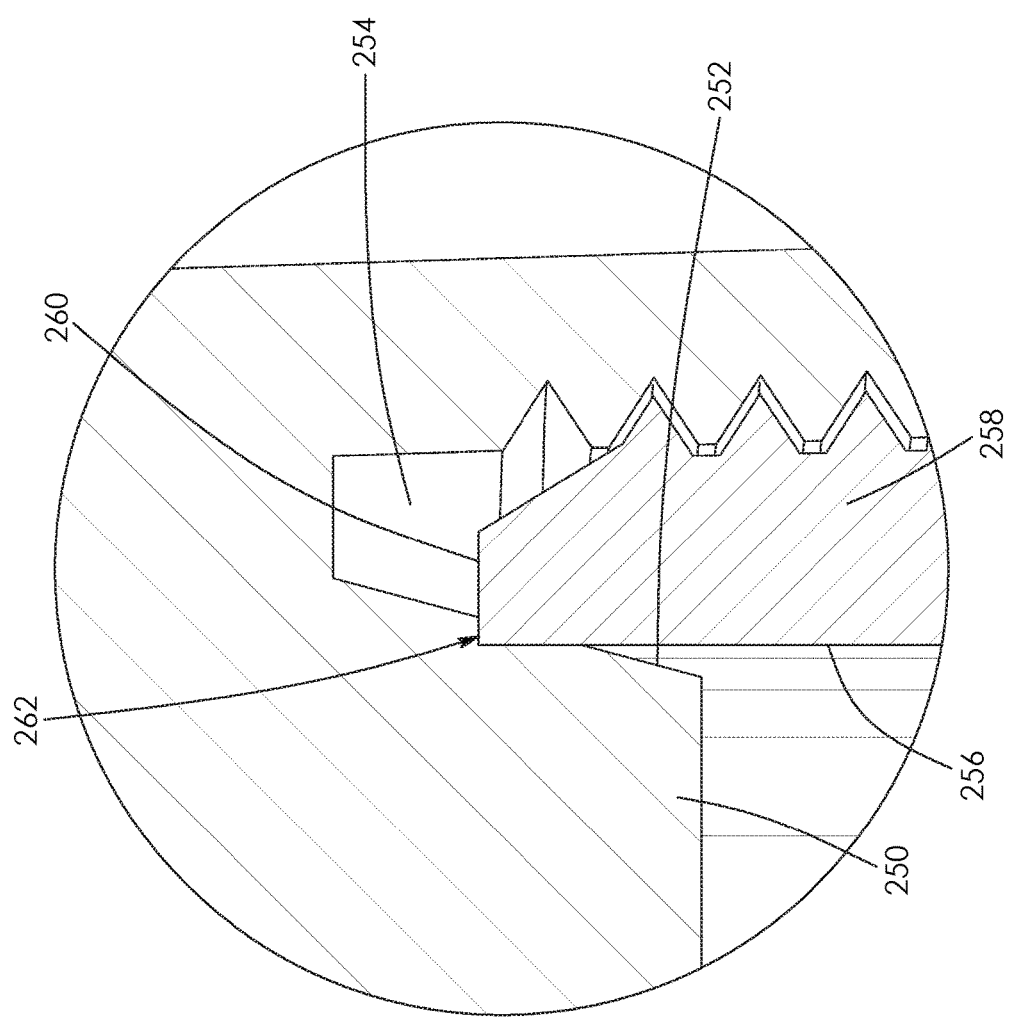
FIG. 16 is an enlarged view of section XVI in FIG. 15.

The female thread protector 210 is further provided with an annular ring 250 extending inwardly from the closed end 216 thereof as best shown in FIG. 14. The annular ring 250 has a sloped wall 252 which is spaced-apart from and faces the threaded annular wall 212 of the female thread protector. The sloped wall 252 is oblique relative to a longitudinal axis 300 of the female thread protector 210. The sloped wall 252 and the threaded annular wall 212 define a tapered annular grove 254. As shown in FIG. 15, the sloped wall 252 of the annular ring 250 comes into frictional engagement with an inner wall 256 of a male threaded pipe end 258 when the female thread protector 210 is threaded onto the male threaded pipe end. In particular, and as best shown in FIG. 16, an end 260 of the male threaded pipe end 258 is wedged into the tapered annular groove 254 as the female thread protector 210 is tightened in place. The end 260 of the male threaded pipe end 258 will also embed into the sloped wall 252 of the annular ring 250 as generally shown at arrow 262 in FIG. 16. This is because the sloped wall 252 of the annular ring 250 is sufficiently deformable to allow the end 260 of the male threaded pipe end 258 to embed into the sloped wall 252 of the annular ring 250, i.e. the end 260 of the male threaded pipe end 258 will deform the sloped wall 252 of the annular ring 250, to the shape of the end 260 of the male threaded pipe end 258, as the female thread protector 210 is tightened in place. However, the annular ring 250 is sufficiently rigid to withstand torque in order to resist and minimize deflection as the female thread protector 210 is tightened in place. This results in a jamming effect as the female thread protector 210 is tightened in place. This in turn necessitates an additional rotational force being required to unthread the female thread protector 210 from the male threaded pipe end 258. The deeper the end 260 of the male threaded pipe end 258 embeds into the sloped wall 252 of the annular ring 250, the greater the rotational force will be required to unthread the female thread protector 210 from the male threaded pipe end 258. This reduces the chances of the female thread protector 210 uncoupling from the male threaded pipe end 258 during transport.

The sloped wall 252 of the annular ring 250 may improve the ability of the female thread protector 210 to protect the male threaded pipe end 258 from lateral, angular, and axial impact forces. The sloped wall 252 of the annular ring 250 may also distribute torque applied to a top outer area of the female thread protector 210 towards a center area thereof to reduce the chances of stress cracks forming on an outside wall of the female thread protector.

It will be understood by a person skilled in the art that the annular ring disclosed wherein may alternatively be referred to by different names including, but not limited to, solid circular wall, ribbed circular wall, or rigid circular wall.

It will also be understood by a person skilled in the art that many of the details provided above are by way of example only, and are not intended to limit the scope of the invention which is to be determined with reference to the following claims.

What is claimed is:

1. A thread protector for a threaded male pipe end, the thread protector comprising:
   a hollow cylindrical body with a substantially closed end;
   a threaded inner annular wall extending from the substantially closed end; and
   an annular ring extending inwardly from the substantially closed end, the annular ring having a sloped wall which is spaced-apart from and faces the threaded inner annular wall, wherein the sloped wall of the annular ring is deformable, to allow the threaded male pipe end to be embedded into the sloped wall of the annular wall, while the annular ring is rigid to withstand torque and resist deflection.

2. The thread protector as claimed in claim 1 wherein the sloped wall of the annular ring and the threaded inner annular wall of the hollow cylindrical body define a tapered groove.

3. The thread protector as claimed in claim 1 wherein the sloped wall of the annular ring is oblique relative to a longitudinal axis of the thread protector.

4. The thread protector as claimed in claim 1 further including spaced-apart bumpers extending circumferentially about the substantially closed end.

5. The thread protector as claimed in claim 4 wherein the bumpers are crescent-shaped and each has a crescent-shaped recess.

6. A combination of a pipe and a thread protector:
   the pipe having an inner wall and a male threaded pipe end; and
   the thread protector having a hollow cylindrical body with a substantially closed end, a threaded inner annular wall extending from the substantially closed end and an annular ring extending inwardly from the substantially closed end, the annular ring having a sloped wall which is spaced-apart from and faces the threaded inner annular wall;
   wherein the sloped wall of the annular ring is deformable, to allow the threaded male pipe end to be embedded into the sloped wall of the annular wall, while the annular ring is rigid to withstand torque and resist deflection.

7. The thread protector as claimed in claim 6 wherein the sloped wall of the annular ring and the threaded inner annular wall of the hollow cylindrical body define a tapered groove.

8. The thread protector as claimed in claim 6 wherein the sloped wall of the annular ring is oblique relative to a longitudinal axis of the thread protector.

9. The thread protector as claimed in claim 6 further including spaced-apart bumpers extending circumferentially about the substantially closed end.

10. The thread protector as claimed in claim 9 wherein the bumpers are crescent-shaped and each has a crescent-shaped recess.

* * * * *